(12) United States Patent
Casey et al.

(10) Patent No.: US 6,965,320 B1
(45) Date of Patent: Nov. 15, 2005

(54) CATHODIC TEST LEAD AND PIG MONITORING SYSTEM

(75) Inventors: Ernest D. Casey, Kathy, TX (US); Ian D. Casey, Kathy, TX (US)

(73) Assignee: Star Trak Pigging Technologies, Inc., Katy, TX (US)

( * ) Notice: Subject to any disclaimer, the term of this patent is extended or adjusted under 35 U.S.C. 154(b) by 525 days.

(21) Appl. No.: 09/999,714

(22) Filed: Oct. 31, 2001

(51) Int. Cl.$^7$ .......................... G08C 19/22; H04Q 9/00
(52) U.S. Cl. ................. 340/870.07; 702/187; 702/188; 324/71.2; 346/33 P
(58) Field of Search ...................... 340/870.07, 870.11, 340/686.1, 686.4; 73/49.5, 40, 40.5 R; 702/187, 702/188; 324/71.2; 346/33 P

(56) References Cited

U.S. PATENT DOCUMENTS

| | | | | |
|---|---|---|---|---|
| 3,754,275 A | * | 8/1973 | Carter et al. ............... | 346/33 P |
| 4,590,799 A | * | 5/1986 | Brown et al. ................. | 73/587 |
| 4,953,144 A | * | 8/1990 | Chin et al. .................. | 367/135 |
| 5,453,944 A | * | 9/1995 | Baumoel ....................... | 703/2 |
| 5,785,842 A | * | 7/1998 | Speck ..................... | 205/777.5 |
| 6,243,483 B1 | * | 6/2001 | Petrou et al. ............... | 382/103 |
| 2001/0029989 A1 | * | 10/2001 | Paz ........................... | 138/104 |
| 2003/0074162 A1 | * | 4/2003 | Fourie et al. ............... | 702/188 |

FOREIGN PATENT DOCUMENTS

| | | | | |
|---|---|---|---|---|
| GB | 1 397 541 | | 2/1971 | |
| GB | 1 397 542 | | 2/1991 | |
| GB | 2297666 A | * | 8/1996 | ............ H04B 5/00 |
| WO | WO 00/16002 | * | 9/1999 | ........... F16L 55/48 |

OTHER PUBLICATIONS

U.S. Appl. No 60/329,022.*
www.qseeman.com, "Half-Cell 2000—Concrete Rebar Corrosion Teste" (2000) (2 pages).

* cited by examiner

Primary Examiner—Timothy Edwards, Jr.
(74) Attorney, Agent, or Firm—Browning Bushman P.C.

(57) ABSTRACT

A pipeline monitoring system includes a series of monitoring stations (20), each having a computer (68), magnetic pig position detector (24), one or more input/output modules (90) and communications module (86). The communications module is operable to transmit data over a communications network from a remotely located monitoring stations (20) to a central monitoring facility (50). Commands transmitted from the central monitoring facility or events generated by the passage of a magnetic pig cause the monitoring station to automatically perform selected processes. The central monitoring facility may also use preprogrammed commands to effect reporting at pre-selected times and dates, and may forward pipe/soil potentials or pipeline damage signals to the central monitoring facility.

32 Claims, 7 Drawing Sheets

CATHODIC TEST LEAD AND PIG MONITORING SYSTEM

FIELD OF THE INVENTION

The present invention relates to computer controlled pipeline monitoring and, more specifically, to multiple monitoring stations which may each include cathodic test leads for detecting pipe/soil potentials, a pipeline pig detector, a pipe damage detector, and a satellite communications module for communication with a central monitoring facility.

BACKGROUND OF THE INVENTION

Pipelines are utilized throughout the world to transport a variety of liquid products, including oil, petroleum products, natural gas, and chemicals. Over a period of time, contaminates or residues accumulate on the inner walls of the pipe, thereby reducing pipeline flow efficiency. In order to extract the build up, an internal traveler known as a pig is propelled through the pipe. Besides cleaning the interior walls of the pipe, pigs are useful for pipe gauging, line fill and dewatering, product separation, leak detection, and corrosion, internal thermal, and/or video surveys.

Because pigs are susceptible to becoming obstructed within the pipe, knowing the location of the pig is critical. In order to ensure accurate location, it is necessary to monitor the pig's progress during pumping (pig propelling) operations. Noise making devices, such as chains or wall tapping devices, have been used to track the location of pigs. However, this method is expensive since crews of technicians stationed at points along the route of the pipeline are required to listen for the pig. Low frequency electromagnetic transmitters have been attached to the pig, but these require on-board power, which is susceptible to failure or power loss. In some countries, hazardous radioactive tracers are used. Offshore operators use pingers, which provide periodic sonic pulses. The seawater acts as a conductor of the sonic pulse for a surface receiver. Using the above techniques, receiving a locating signal from the pig was often unreliable.

Pig monitoring stations were developed to indicate the passage of the pig along a point, or station, of the pipeline. A mechanical signaling device was inserted into a small hole of the pipeline, allowing a lever to hang down into the pipe. Upon the passage of the pig, the lever was hit which set a visual flag on the external surface of the pipe. Later, microswitches were added which sent a closure signal to a console to indicate passage of the pig. Although these mechanisms provide location data, the intrusion created for the mechanical signaling device undesirably affect the integrity of the pipeline since the entire system must be shut down for maintenance of the pig passage signaling device.

Non-intrusive pig detector mechanisms were developed which used magnetic passage indicators and a permanent magnetic circuit that became part of the pig's construction, becoming a "magnetic pig". The magnetic circuit could be attached to most types of pigs, including inflatable spheres. The magnetic pig created a magnetic field sufficient to saturate the wall of the pipe through which the pig is traveling. Magnetic passage indicators, placed along the length of the pipeline and in close proximity to the pipe wall, allowed the operator to track the pig through the pipeline. Each magnetic passage indicator signaled the pig's arrival and indicated the time of the event. A subsea passage indicator included the ability to transmit the signal either acoustically or via an underwater umbilical to the surface. Permanently mounted passage indicators were adapted to radio telemetry.

Sensitive magnetic sensing instruments, such as flux-gate gradiometers, have been utilized successfully to locate the pig, provided the pipeline is not buried too deep. In marine applications, a diver equipped with a marine flux-gate gradiometer is commonly used to locate the pig. These techniques have significant disadvantages in that they use significant personnel to perform the search and hopefully locate the pig.

All forms of pigs are susceptible to becoming lost or obstructed during their travel from one section of the pipeline to another. Once found, the pig can be extracted or corrected. Since magnetic passage indicators provide indications to locate the pig between two known points with time-of-event data, the pig can be accurately tracked. However, the distance between magnetic passage indicators may be as great as several miles, and the expense of locating the lost pig includes high personnel costs and long delays, leading to lost production. A more efficient and timely determination of the pig's position is desired to reduce personnel costs and down time.

Inspection pigs are used to detect the extent of corrosion in oil and gas pipeline systems. The most common type of inspection pig is the magnetic flux leakage pig (MFL) which utilizes a strong magnetic field to saturate the wall of the pipe as the pig travels along the pipeline. Magnetic sensors positioned around the body of the pig detect deviations in the magnetic field, thus indicating pitting or corrosion of the wall of the pipeline. After detection of corrosion, it has been a problem to accurately identify, within a few feet, the location of the pig along the pipeline when the corrosion signal was obtained. An odometer has been used to count the footage traveled from the start of the operation. However, odometers may "skid", causing erroneous information. A higher degree of accuracy has been obtained utilizing an internal timer synchronized to the Global Positioning System (GPS) time prior to the launch of the pig. As the pig passes magnetic markers at monitoring stations which have been surveyed into GPS coordinates, the marker captures the event time. After the completion of the pig's survey run, the timing of the passage indicators is compared with the internal clock and the events detected by the inspection pig, thereby providing a more accurate indication of the location of pitting or corrosion along the pipeline.

In addition to concerns regarding pitting or corrosion of the internal pipe wall, corrosion also may occur on the outer wall or skin of the pipeline. Pipelines are protected from external corrosion by insulating the outer skin of the pipe from the earth using a coating or protective wrapping. Due to insufficient wrapping protection, the integrity of the cathodic protection at sections along the pipeline route may be susceptible to corrosion. In addition, a low voltage, typically −1.2 vdc, is applied to the pipe relative to ground. Current producing systems, known as cathodic protection rectifiers (CPRs), are positioned at strategic points along the pipeline route. CPRs produce a low voltage and a high amperage which is continuously applied to the pipeline. Cathodic test leads connected to the skin of the pipeline and to ground at these stations detect pipe/soil potentials with a voltmeter. A negative voltage between −1.2 vdc and −0.85 vdc is generally considered acceptable. Cathodic test lead stations may also provide a direct connection to the pipeline and a protective casing surrounding the pipeline. Protective casings are used at road crossings and are insulated from the wall of the pipeline. By utilization of a half cell electrode coupled to a volt meter and connected to the test lead station, pipe/soil potentials can be obtained. A negative voltage between −1.2 vdc and −0.85 vdc is generally considered acceptable. Most CPRs are monitored for voltage, amperage and meter readings. Cathodic test lead stations are typically positioned at one-mile intervals, or at stations of easy access, e.g., pipeline warning sign locations and road crossing locations. Operators routinely visit these cathodic test lead stations at monthly intervals to obtain pipe/soil potentials, thereby ensuring reliability of the cathodic protection system.

Contractors digging close to pipelines may inadvertently damage a pipeline. Damage to the pipe protective wrapping often leads to corrosion, which is the major cause of pipeline leaks or blowouts. Also, attacks to the pipeline by terrorists or illegal tapping of the pipe contents can cause severe disruption to the pipeline system.

Obtaining monthly data cathodic test lead stations is labor intensive, and prevents technicians from performing other pipeline duties. Moreover, this labor intensive staff typically experience long driving hours under variable weather conditions. Pipeline operators recognize that many driving accidents occur in the pipeline industry because of the need to periodically monitor the cathodic test lead stations.

The disadvantages of the prior art are overcome by the present invention, and the improved pipeline monitoring system is hereafter disclosed.

SUMMARY OF THE INVENTION

A pipeline monitoring system according to a preferred embodiment includes a series of monitoring stations positioned along a pipeline. Each monitoring station is capable of communicating with a central monitoring facility, both for transmitting commands to the monitoring station and for receiving monitoring signals at the central monitoring facility. The monitoring station may be responsive either to a command from the central monitoring station, or to a computer with a pre-programmed event time at the monitoring station, or to a magnetic pig detected at the monitoring station as it is passed through the pipeline.

Each monitoring station may include a computer, a communications modem, input/output modules and a magnetic sensing module. The computer is adapted to receive a number of input/output modules which are individually configured to interface to a wide variety of measuring instruments and control equipment for the measurement of, e.g., pipeline pig detection, pipe/soil potentials, pipeline damage detection, CPR current, voltage, and meter readings, and valve monitoring and activation. The communication module interfaces the monitoring station to the central monitoring facility through a satellite communications network, preferably the Low Earth Orbiting (LEO) satellite system, so that the pipeline can be monitored in real time without requiring technicians at each monitoring station.

It is an object of the present invention to provide an improved method of monitoring magnetic pipeline pigs and/or obtaining pipe/soil potentials and/or detecting pipeline damage, thus saving pipeline operators labor and reducing driving accidents.

It is a feature of the present invention that each monitoring station includes a satellite communications module for interfacing with a LEO satellite system. A related feature of the invention is that the central monitoring facility includes a control station to output command signals to the plurality of monitoring stations. Each of the plurality of monitoring stations may also include a computer for outputting an activity signal to operate the monitoring station.

Another feature of the invention is that the satellite communications module outputs a time signal in response to the magnetic pig position detector, so that the central monitoring facility may easily determine the location and the speed of the pig moving through the pipeline. The pipeline monitoring system may also include digital-to-analog converters, analog-to-digital converters, and a reset circuit for applying opposite current pulses to the magnetic pig position detector.

Still another feature of the invention is that satellite communication module outputs pipe/soil potentials at periodic intervals to the central monitoring facility. Pipe/soil potentials from the number of monitoring stations may be obtained substantially simultaneously, so that comparisons between potentials at different locations can be analyzed. Pipe/soil potentials may alternatively be output sequentially or upon command from the central monitoring facility, so that a pipe/soil potential may be obtained each day of the month from one of the 30 monitoring stations.

Still another feature of the invention is that the potential pipeline damage signal may be generated, e.g., by a geophone or a vibration detector, and the potential pipeline damage signal transmitted through the satellite communications module to a central monitoring facility. This feature of the invention provides significant safety for pipeline operations to minimize damage from accidents or terrorism.

Another feature of the invention is that the pipeline monitoring system is reliably able to monitor various pipeline operations, including the position of a valve, pressure and temperature of a fluid in the pipeline, monitoring the flow of fluid in the pipeline, and sensing one or more of CPR current, CPR voltage, and CPR meter readings. The pipeline system is also able to actuate devices at the monitoring station, e.g., activating a valve in response to instructions from the central monitoring facility, Another feature of the invention is that the satellite communications module may be housed within a pipeline marker. A power source may be provided at each monitoring station to power the satellite communications module. In a subsea environment, a buoy is provided for supporting the satellite communications module, and transmission means are provided for transmitting a signal from the magnetic pig position detector from subsea to the satellite communications module.

According to the method of the invention, the passage of a magnetic pig is detected at each of the plurality of monitoring stations, and a signal output from the satellite communications module to the central monitoring facility indicates the passage of the pig. Pipe/soil potentials may be detected at a pre-programmed time and a voltage signal output through a satellite communications module. A damage alert module, when activated, will send a potential pipe damage signal to the central monitoring facility through the satellite communications module. The central monitoring facility may determine the speed of the magnetic pig moving through the pipeline, and estimate the arrival of the magnetic pig at another monitoring station. The central monitoring facility may generate command signals which are forwarded to a satellite communications module to operate each of the plurality of stations. If desired, a valve may be actuated in response to the detection of a passage of the magnetic pig.

A significant advantage of the present invention is that the cost of monitoring pipeline operations is significantly reduced, while also reducing the risk of accidents involved with pipeline personnel manually checking operations at monitoring stations.

A related advantage of the invention is that each of the components of the system is readily available, so a highly reliable and cost effective monitoring system is obtained.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
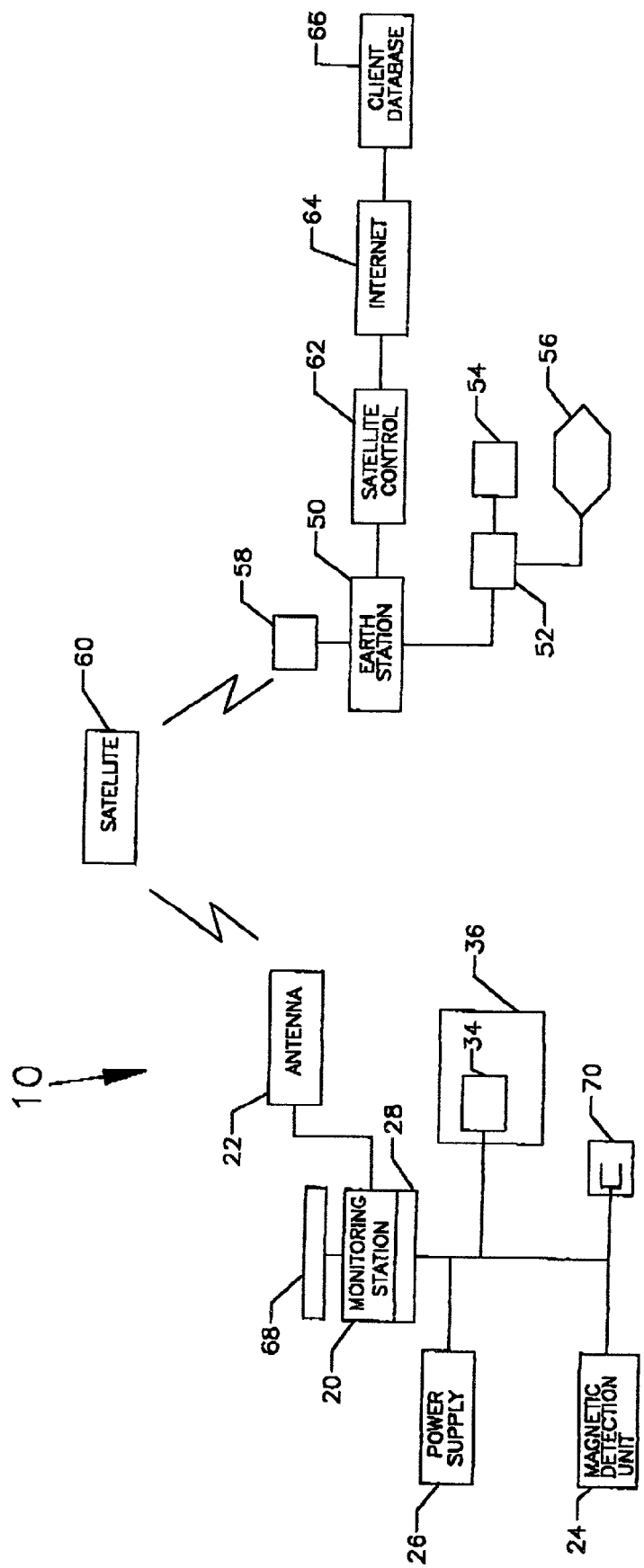
FIG. 1 is a block diagram illustrating a pipeline monitoring system according to the present invention.
Figure 3:
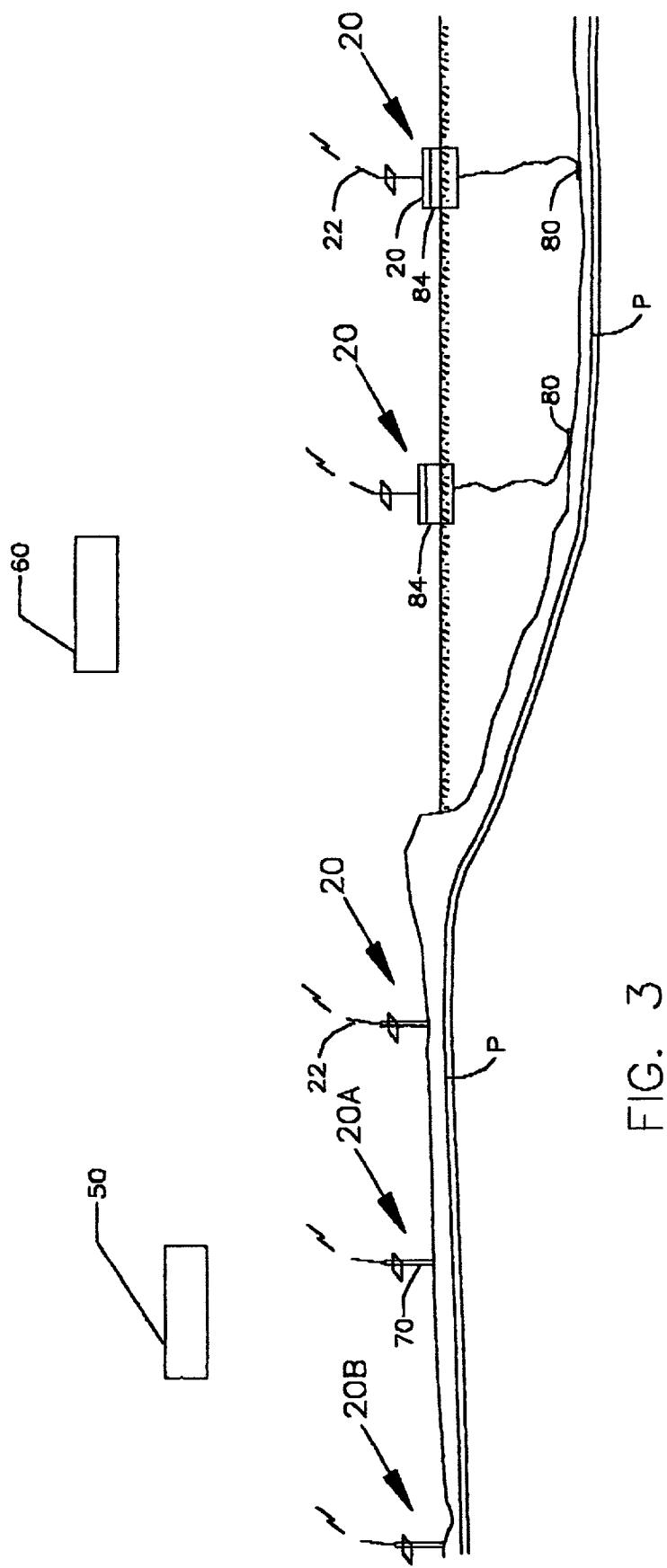
FIG. 3 illustrates both surface and subsea monitoring stations for a pipeline.

FIG. 1 illustrates a pipeline monitoring system 10 according to a preferred embodiment of the invention, As shown in FIG. 3, the pipeline P being monitored may include a plurality of pipe sections which are land based and underwater. The wide variety of environmental conditions which the pipeline may be exposed are known to those skilled in the art.

Positioned along the pipeline are plurality of monitoring stations 20, with one such station being shown in FIG. 1. The number of monitoring stations will depend on the length of the pipeline being monitored, and literally hundreds or thousands of monitoring stations may be monitored according to the system of the present invention. Each monitoring stations communicates with a central monitoring facility 50, as discussed below.

Each monitoring station 20 serves as a data collection unit. A data transmission unit 22, which may include an antenna and related communication circuitry such as that offered by Quake Global Communications, forwards the sensed data via satellite 60 to the central facility 50. A magnetic pig position detector 24 is positioned close enough to the pipeline so that the magnetic field developed within the pipe by the pig is detected, thereby signaling pig position. The monitoring stations 20 may be installed when the pipeline is first laid or may be a retrofit to an existing pipeline. The monitoring stations may be conveniently positioned at pipeline warning signs typically positioned at road or waterway crossings.

Referring still to FIG. 1, monitoring station 20 is adapted to receive receives signals from test leads 70 to determine the pipe/soil potentials for cathodic protection of the pipeline by the cathodic protection rectifiers (CPRs) 36. The CPRs may also be used to transmit power to the monitoring station 20 which may then be used for monitoring various sensors 88 (see FIG. 4), including potential pipeline damage sensors, the CPR voltage, CPR current, CPR meter metering, leak detection, fluid flow rate through the pipeline, fluid temperature and pressure, valve position information, and pipeline temperatures.

An important pipeline operation to be monitored is a warning against foreign objects causing damage to a pipeline system. Others digging in the area of pipelines may damage the pipeline coating or cause indentations to the pipe wall. One of the sensors 88 is thus a potential pipeline damage detector or sensor, such as a geophone or a pipeline vibration sensor, which is coupled to the central monitoring station 50 to alert the pipeline operator of potential pipeline damage, which may be due to terrorist activities, by outputting a potential pipeline damage signal and the location of the event. As each analog signal from sensor 88 is received, the conditioner 92 converts the analog voltage to a digital signal. Command signals from the central monitoring facility may control a valve actuator for controlling operation of a valve at the monitoring station.

Figure 2:
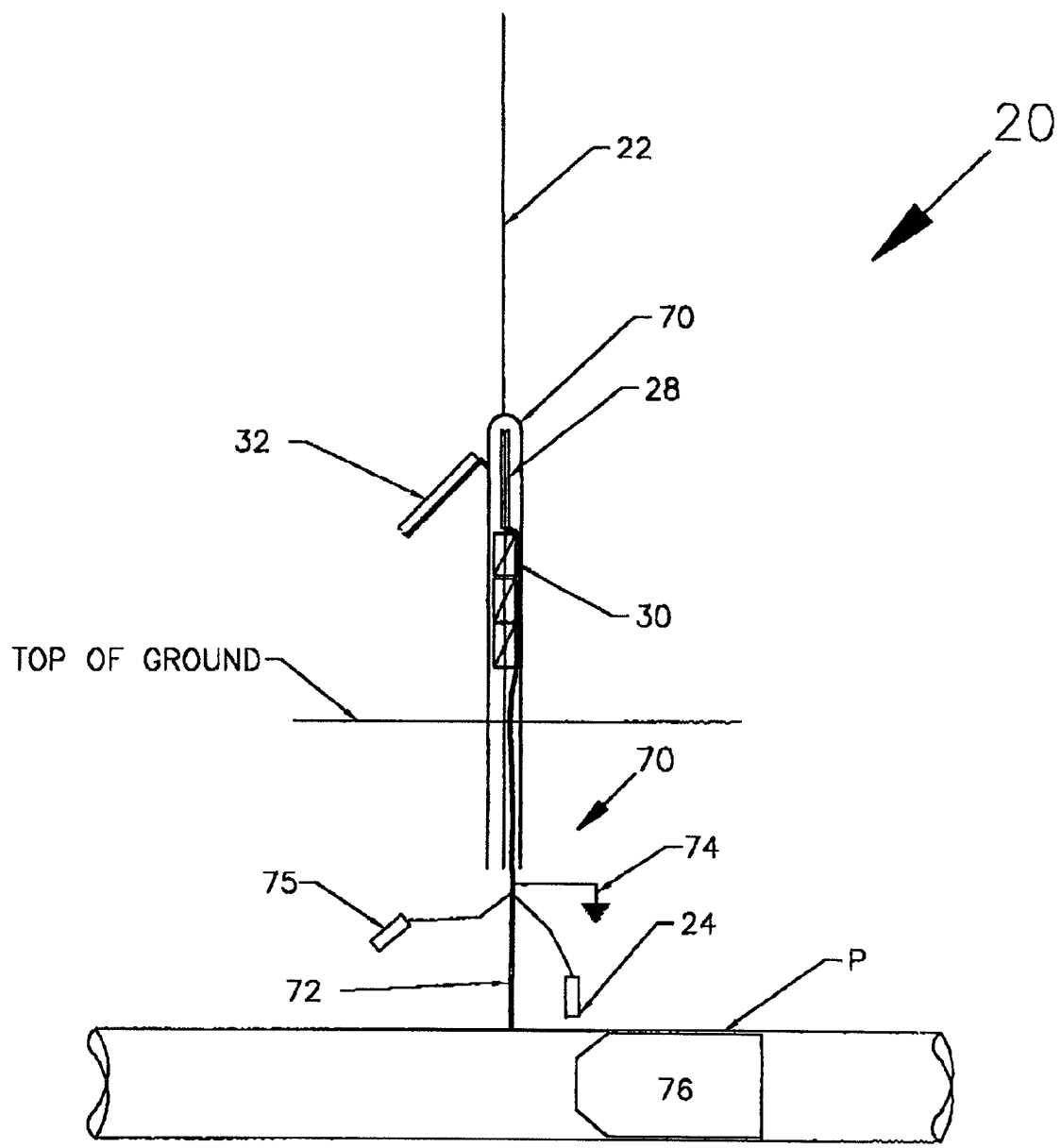
FIG. 2 depicts a monitoring station positioned along the pipeline.

Each monitoring station 20 includes a power source 26 to power circuitry 28. The power source 26, which may be a battery 30 and/or solar collector 32 as shown in FIG. 2, may also power the data transmission unit 22. Connecting the power source 26 to the data transmission unit 22 also provides the operator at the central monitoring facility 50 with the information required to test or change the power source.

In another embodiment, the monitoring station 20 receives power from the voltage applied directly to the pipeline by the power source 34 of the cathodic protection rectifiers (CPRs) 36. The CPRs 36 place a voltage, typically between −0.85 vdc and −1.2 vdc, at various locations along the pipeline to protect the pipeline from corrosion. Hence, the monitoring station 20 may be powered without any power source other than the voltage applied to the pipeline by the CPRs 36. A monitoring station power source will typically operate at a voltage up to about 5 volts to about 24 volts. Quick disconnect determinations may be used for all power and communication components.

Referring to FIG. 2, a typical monitoring station 20 may be positioned at a pipeline marker 70, which extends upwardly from the ground and marks the location of the buried pipeline P. Battery packs 30 previously discussed may be positioned within the pipeline marker, and solar panel 32 may be secured at an upper end of the marker 70. The antenna 22 extends upward from or may be contained within the pipeline marker, while the electronics package or circuitry 28 is housed within the pipeline marker. Although various functions may be monitored, the monitoring station 20 preferably includes at least a magnetic pig position detector 24 and test leads 70 for outputting signals indicative of the pipe/test voltage. As shown in FIG. 2, the test leads include pipeline test lead 72 for obtaining a voltage signal of the pipeline P and ground test lead 74, which may go to ground. A half-cell 75, which may be buried in the ground, may be used to monitor the voltage differential between test lead 72 and ground lead 74. The half-cell potential technique is an established and reliable method of monitoring pipeline voltage potential.

Referring now to FIG. 3, the satellite communication system 60 is able to communicate with both land base monitoring stations 20, 20A, and 20B as shown in FIG. 3, each substantially similar to the system shown in FIG. 2. When the pipeline is under water, the subsea sensor packages 80 provide signals of the pipeline operation, and transmit those signals by various means, including conventional wirelines 82, to the monitoring station 20, which in this case may be supported on a surface buoy 84. The conductors 82 may be umbilical cables. When the pipeline is at an offshore location of greater than about 400 feet, high wire conductors are not preferable, and instead data may be acoustically transmitted from subsurface to the surface buoy.

Figure 4:
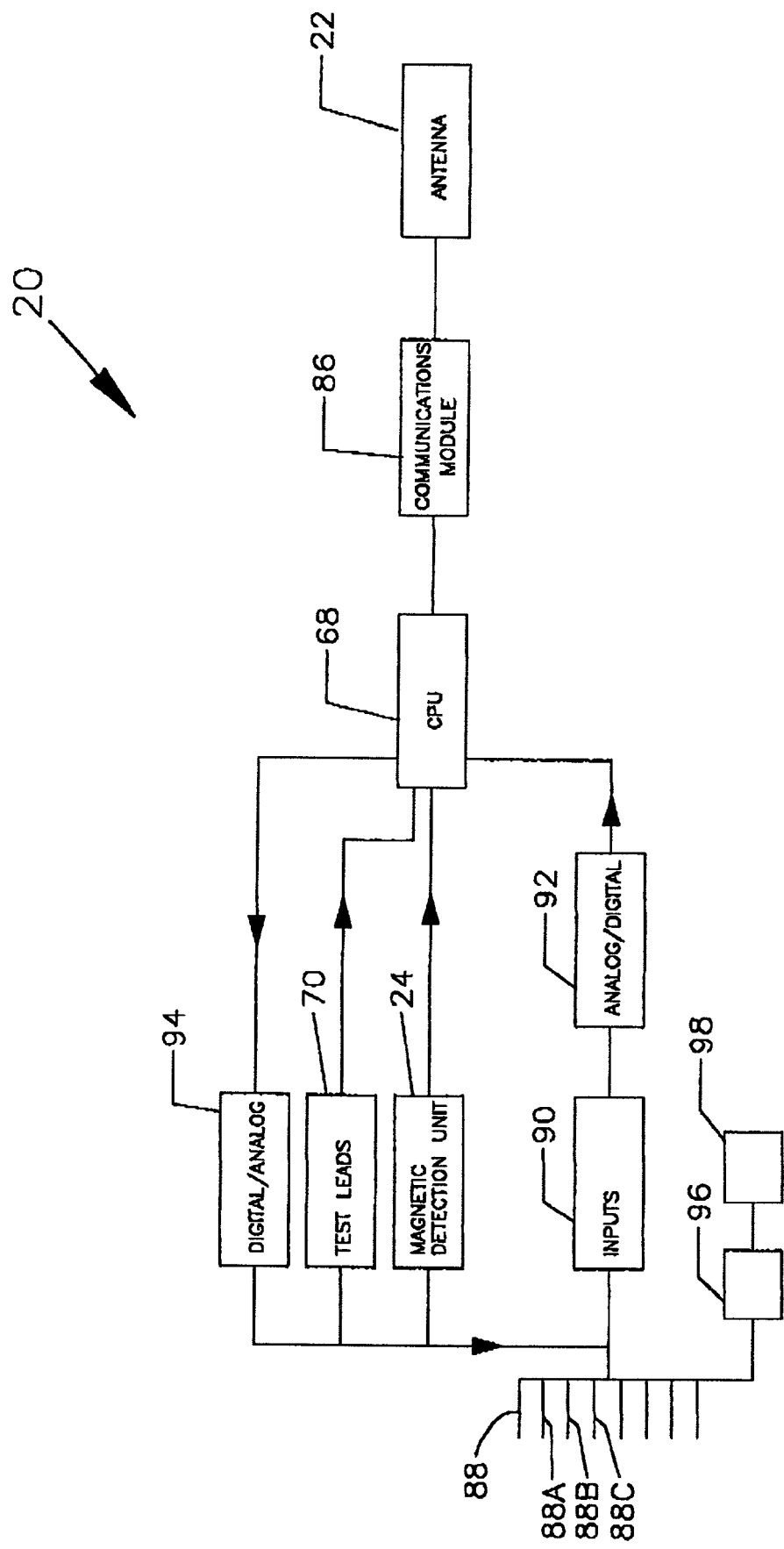
FIG. 4 is a block diagram of a monitoring station.

Referring to FIG. 4, the monitoring station includes a computer 68 and satellite communications module 86 for interfacing with antenna 22. Sensors 88, 88A, 88B provide pipeline monitoring signals to input/output module 90. An analog to digital (A/D) converter 92 may connect module 90 to computer 68. A digital to analog (D/A) converter 94 provides conversion from the computer to the sensors 88, with the computer including firmware sufficient to control the various sensors 88. A command signal from the central monitoring facility 50 to the communications module 86 may be converted by A/D converter 94 for activating actuator 96 which controls opening and closing of valve 98. The pig position detector 24 and the test leads 70 are preferably used at every monitoring station, and similar A/D converters may be used between the computer 68 and both 24 and 70.

Data transmission as shown in FIG. 1 is adaptable to a variety of communications systems by selecting a corresponding communications module 86 and antenna 22. Each communications module 86 may include circuitry to interface the monitoring station 20 to the satellite communications system. The computer 68 is capable of entering a sleep mode to conserve power. The computer 68 may be awake when the magnetic pig 76 as shown in FIG. 2 passes by the monitoring station. The computer alternatively may be awakened in response to a signal from the control station 52 of the central monitoring facility 50, or in response to a clock within the computer 68. In either case, the triggering event causes the computer to perform selected tasks.

Although monitoring station 20 could theoretically communicate over a variety of wireless communications channels or mediums, including microwave radio, cellular radio and satellite communications, the preferred choice is the satellite system discussed below. Communication between antenna 22 and central monitoring facility 50 could use a microwave transmission/receiver to communicate with a microwave receiver/transmitter at the central monitoring facility 50. Links of microwave stations may allow one station to communicate with the next microwave station. Undesirably, however, expensive microwave stations would be required at each monitoring station 20. Alternatively, a cellular phone network could be developed between a cellular phone links at the monitoring stations to communicate with the central monitoring facility 50. The use of a truck mounted radio link allows a technician to stay in communication with the pig even though the pig is a great distance removed. Cellular phone transmission often is poor, however, in remote areas where pipeline is often buried.

The preferred wireless communications system between antenna 22 and central monitoring facility 50 is the satellite communication system and service provided by Orbcomm, GlobalStar, or Iridium. Each of these satellite communications systems are Low Earth Orbiting Satellite Systems (LEOs). The satellite of an LEO has an orbital altitude range from 500 to 2000 km above the surface of the Earth. LEO satellites are conventionally part of constellations of satellites that achieve wide coverage of the Earth's surface with lower power requirements and shorter propagation delays that can be achieved with, e.g., geostationary orbit (GEO) satellites. Medium Earth Orbit (MEO) satellites have altitudes from 8000 to 20,000 km above the Earth, and GEOs have altitudes above 35,000 km above the Earth. LEO satellites may have equatorial or polar paths and both data and voice-and-data communications may be transmitted at preassigned frequency ranges. The LEO satellite system is able to transmit accurate and timely data from pipeline monitoring stations to any location in the world via the Internet.

Transmission from the monitoring station is linked to a satellite 60, which in turn is linked to Earth station or central monitoring facility 50, which includes a computer 52, display screen 54, and control station 56. If desired, a fiber optic linkage may be used to transmit data from the satellite receiver 58 to the central monitoring facility 50, or from the facility 50 to converter 62, which may then transmit data via the Internet 64 to another database 66. The approximate delay time between the initial data transmission and receipt of the data at the central monitoring facility should be approximately one minute or less, depending on the site. Those skilled in the art will appreciate that, while the control station 56 as shown in FIG. 1 is part of the central monitoring facility 50, conventional communication systems may be positioned so that data may be output or displayed at various locations, and control may be from either the central monitoring facility 50 or any of various control stations to the monitoring stations 20 to control activities performed at each monitoring station in response to commands. Also, the monitoring station 20 preferably includes a computer 68, which at minimum may include a time clock for outputting activity signals to the monitoring station. Also, programs within computer 68 may be programmed by command signals from the central monitoring facility 50 utilizing the satellite communication system 60.

Figure 5:
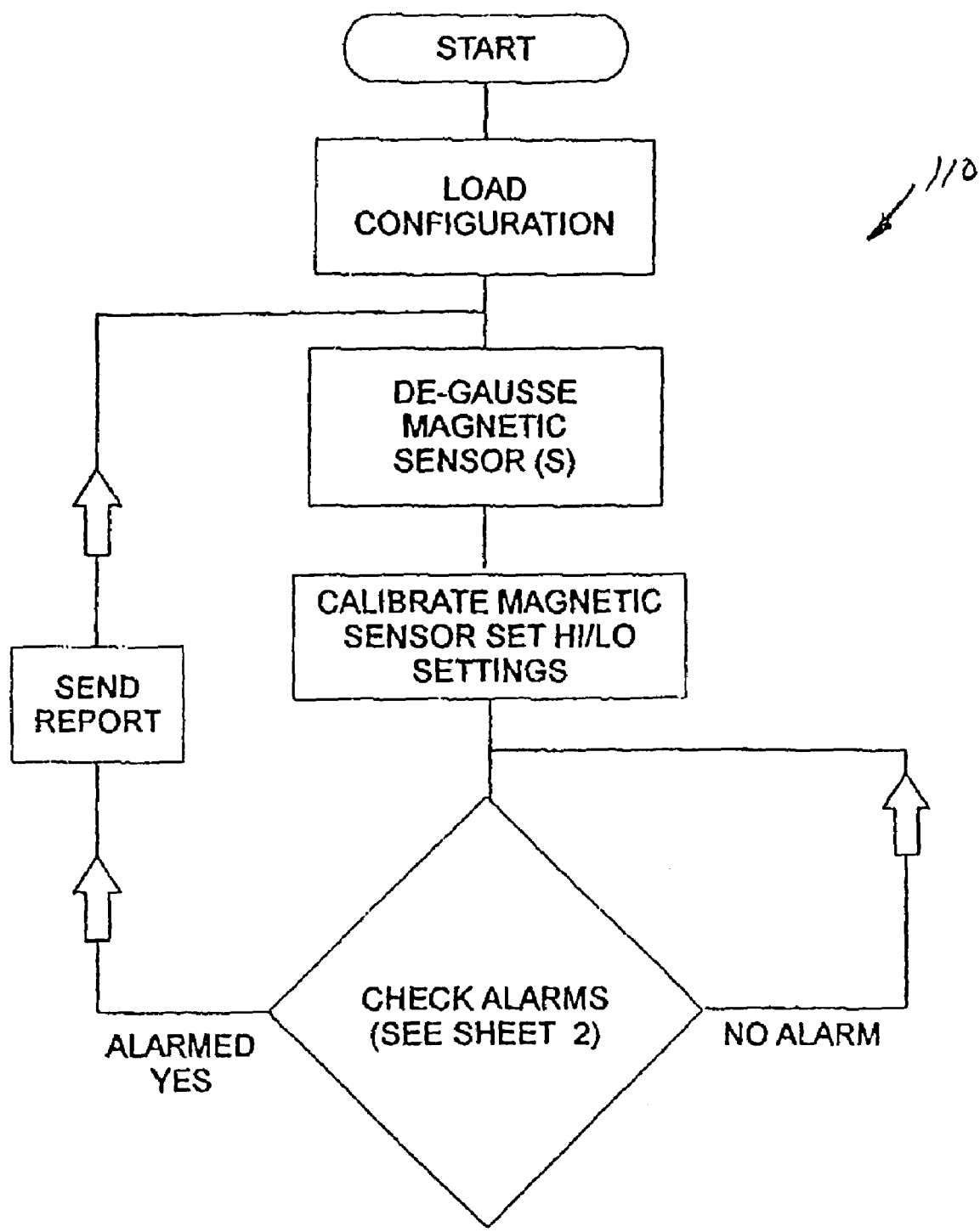
FIG. 5 is a block diagram of a pig signaling detector.
Figure 6:
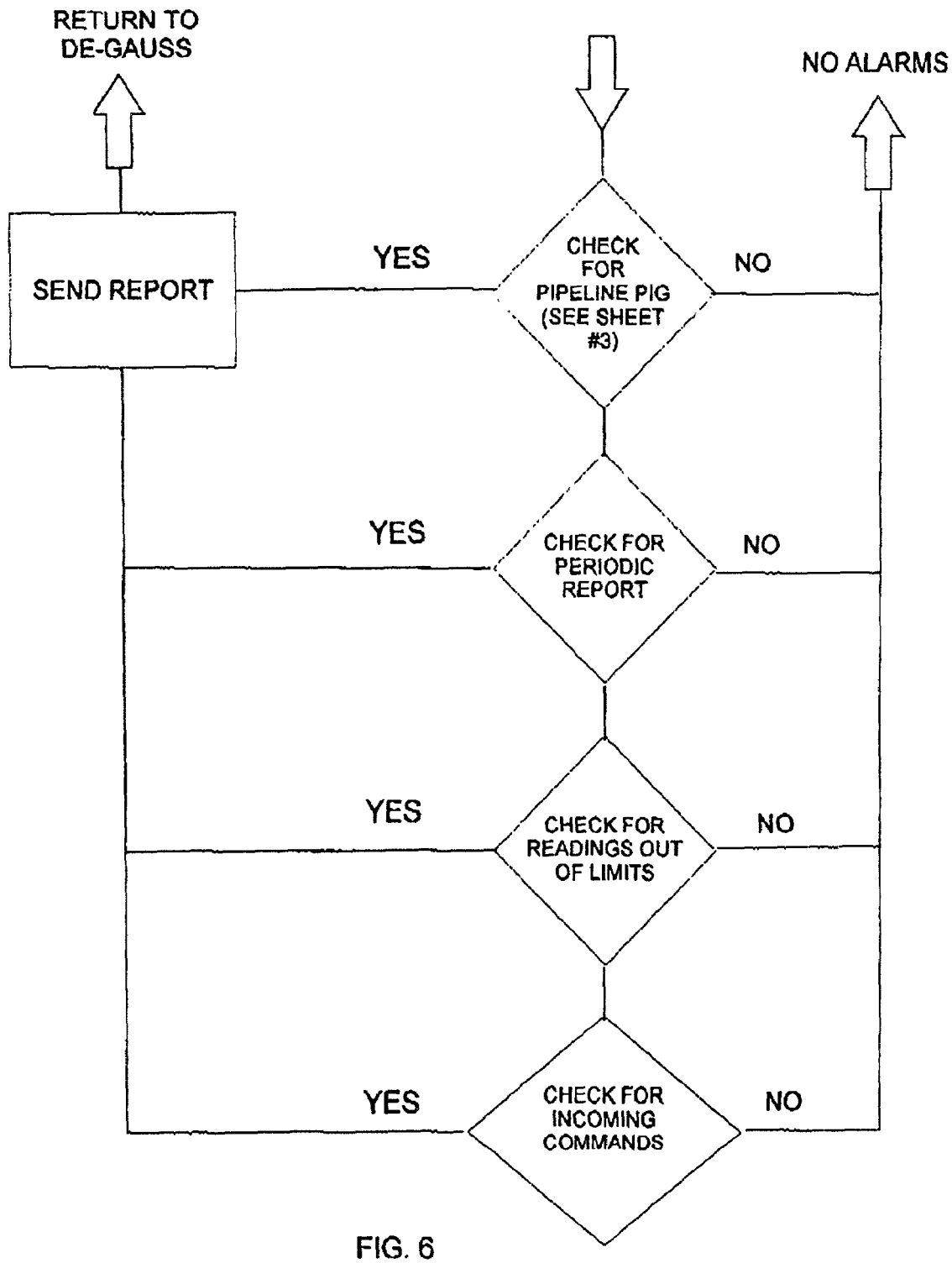
FIG. 6 is a block diagram of the check alarms section shown in FIG. 5.
Figure 7:
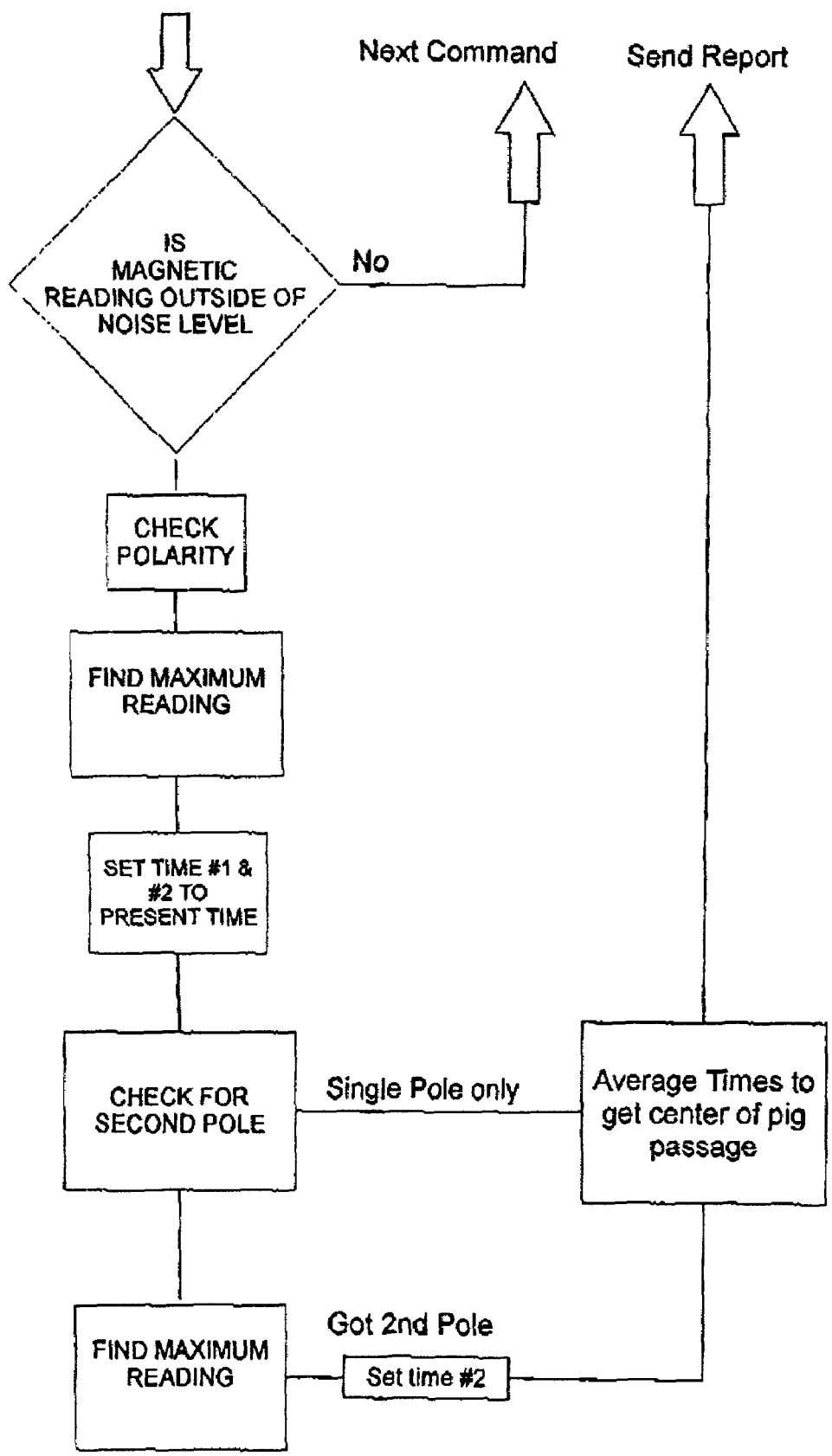
FIG. 7 is a block diagram of the pipeline pig check section shown in FIG. 6.

FIG. 5 is a flow chart of the magnetic sensing module 110 within the computer 68, or if desired within the computer 52 of the central monitoring facility 50. The magnetic sensing module 110 may receive eight analog inputs and one or more digital inputs. The analog inputs are converted to digital signals by A/D converter 92 (see FIG. 4). The computer 68 provides one or more digital outputs and one or more analog outputs that are converted by D/A converter 94. When power is applied or when the computer is reset, the computer may begin operation by resetting or degaussing the sensor 24, and performing similar operations on other sensors.

Next, the computer 68 takes readings over a period of time to locate maximum and minimum ambient noise to set data thresholds. The computer 68 then loops between steps to wait for an external event, such as the passage of the magnetic pig. Data is read from the magnetic sensing module 24 and the computer 68 determines if the data indicates passage of the magnetic pig. If the pig has not passed, then the computer 68 again samples data from the magnetic sensing module 24. If the pig is detected, the computer proceeds to power up the communications module 86 in preparation for data transmission. The computer 68 may also sample data from a field interface unit which includes one or more sensors 88, then transmits the data to the central monitoring facility 50. The computer 68 also determines if another field interface unit is connected to the computer and, if so, to sample and transmit the data corresponding to the next field interface module. Once all the data is obtained, the computer 68 proceeds to power down the communications module to conserve power. Even though communications module is powered down, communications receiving circuitry remains powered up to receive data or command form the central monitoring facility 50. After the data is communicated, the computer 68 proceeds to determine if the magnetic sensor 24 has become saturated. The output of the magnetic pig position detector 24 will drift or become offset if the sensor is again degaussed. If the output from sensor 24 is not saturated, the computer 68 waits for a command signal from facility 50, or the passage of a pig, or a signal from the time clock within the computer. Signals from other sensors may be treated accordingly by the computer 68.

As the magnetic pig passes each monitoring station 20, an event is generated which causes information to be transferred to the central monitoring facility 50. In addition to the information discussed above, a station identification and time of the event is passed to the central monitoring facility. As the pig passes a number of the monitoring stations 20, the central monitoring facility 50 is able to use this information in determining the speed of the pig and the estimated time of arrival at the next station 20.

Magnetic circuitry carried by the pig may be utilized to activate external equipment, such as valves, which may be sequenced during operations by the passage of the pig. Control in this manner may direct flow from the pipeline into holding tanks, e.g., when products carried by the pipeline do not need to be transported the entire pipeline length. Due to the configuration of the magnetic pig, the magnetic fields on board the pig may be arranged in a north-south configuration, or conversely in a south-north configuration, that is detectable by the magnetic pig position detector 24. The different polar configurations may then be used to cause the opening and closing of the valves at certain points along the pipeline.

While various pipeline maintenance and operational data may be easily gathered by the sensors 88 of the monitoring station 20, none is more important than cathodic protection tested with test leads 70 and potential pipeline damage sensors. Periodic checks of cathodic protection may be easily performed when a pig is sent through the pipeline. Monitoring stations 20 near CPRs 36 may thus relay rectifier voltages data to the central monitoring facility 50 to ensure that the pipe is protected by cathodic currents. Geophones, vibration sensors, or other pipeline damage sensors may forward a potential pipeline damage signal in substantially real time to the central monitoring facility. The same or other stations may take measurements to detect leakage and ensure proper settings. Fluid temperature, pressure and flow rates may be easily monitored and relayed to the facility 50 in a similar manner. Sensors may be provided for cathodic rectifier metering, alarm notification, external pipeline damage, flow rates, fluid temperatures and pressures, valve status, valve control, and pipeline pig monitoring. Various types of alarms may be provided, including system failure alarms, high and low limits.

Station identification may be easily correlated to a GPS location, and all triggering events may be monitored as a function of time. Monitoring according to the system of the present invention increases safety and allows the pipeline operator to better protect the pipeline asset. As one example, component failure may trigger an alarm which allows the pipeline operator to promptly correct problems while minimizing downtime. According to the method of the invention, a central monitoring facility computer may easily determine the speed of the pig as it is passing through the pipeline, and pig travel can be displayed in substantially real time to the operator, since the flow rate of the pig may be easily determined and the spacing between stations is known. Additionally, the monitoring station is able to control electronic settings of rectifiers at or near the monitoring station.

A magnetic sensing device, which serves as the pig position detector 24, may be a single axis magnetoresistive circuit HMC1O1 made by Honeywell, connected to the inputs of the amplifier. Other magnetic sensing means, such as inductive coils, flux gates and hall-effect sensors may be used. A reset circuit responsive to the computer 68 may be used to eliminate signal degradation of the magnetic sensing device caused by continuous exposure to magnetic fields.

The magnetic sensing device 24 may be calibrated to a predetermined reference point by computer 68. An analog feedback signal may be provided from the computer to compensate for background magnetic fields, such as those created by the earth and overhead electrical lines.

A low operational cost pipeline monitoring system is thus disclosed which may utilize a magnetic pig to automate the collection of data from a number of sources and transmit the data via a satellite communications systems to the central monitoring facility. A pipeline monitoring system as disclosed herein may also be used for transmitting pipe/soil potentials from a plurality of monitoring stations to the central monitoring facility. Additionally, a satellite transmission system may be used for monitoring pipeline damage, and signals from a geophone, vibration sensor, or other pipeline damage sensor may be transmitted to the central monitoring facility upon the generation of a potential pipeline damage signal.

The foregoing disclosure and description of the invention are illustrative and explanatory thereof, and various changes in the size, shape, materials, components, circuit elements, wiring connections and contacts, as well as in the details of the illustrated circuitry and construction method of operation may be made without departing from the spirit of the invention.

What is claimed is:

1. A pipeline monitoring system, comprising:
   a plurality of monitoring stations positioned along a pipeline;
   a central monitoring facility for generating command signals to operate each of the plurality of monitoring stations;
   a satellite communications module at each of the plurality of monitoring stations for interfacing with the central monitoring facility; and
   a magnetic pig position detector at each of the plurality of monitoring stations for detecting the passage of a magnetic pig and outputting a pig position signal to the central monitoring facility;
   cathodic test leads for detecting pipe/soil potentials for outputting a voltage signal to the satellite communications module; and
   a pipeline damage detector including at least one of a pipeline vibration sensor and a geophone for outputting a potential pipeline damage signal to the satellite communications module.

2. The pipeline monitoring system as defined in claim 1, wherein the central monitoring facility includes a control station to output command signals to the plurality of monitoring stations.

3. The pipeline monitoring system as defined in claim 1, wherein each of the plurality of monitoring stations includes a computer for outputting an activity signal to operate the monitoring station.

4. The pipeline monitoring system as defined in claim 1, wherein said satellite communications module outputs a time signal in response to the magnetic pig position detector.

5. The pipeline monitoring system as defined in claim 1, further comprising:
   a pipeline marker for housing the satellite communications module.

6. The pipeline monitoring system as defined in claim 1, further comprising:

a buoy for supporting the satellite communications module above water; and transmission means for transmitting a signal from the magnetic pig position detector from subsea to the satellite communications module.

7. The pipeline monitoring system as defined in claim 1, further comprising:

a CPR sensor for sensing one or more of CPR current, CPR voltage, and CPR meter reading and outputting a CPR signal to the satellite communications module.

8. The pipeline monitoring system as defined in claim 1, further comprising:

a valve actuator responsive to the satellite communications module for controlling operation of a valve.

9. The pipeline monitoring system as defined in claim 1, further comprising:

a valve position sensor for outputting a valve position signal to the satellite communications module.

10. The pipeline monitoring system as defined in claim 1, further comprising:

at least one of a pressure sensor and a temperature sensor for outputting a pressure signal and a temperature signal, respectively, to the satellite communications module.

11. The pipeline monitoring system as defined in claim 1, further comprising:

a flow meter sensor for outputting a fluid flow rate signal to the satellite communications module indicative of fluid flow rate through the pipeline.

12. The pipeline monitoring system as defined in claim 1, further comprising:

an input/output module for outputting an activity signal to operate the monitoring station in response to the magnetic pig position detector.

13. The pipeline monitoring system as defined in claim 12, further comprising:

a digital to analog converter for providing signals to the input/output module; and an analog to digital converter for outputting signals from the input/output module to the satellite communications module.

14. The pipeline monitoring system as defined in claim 12, further comprising:

a digital to analog converter for providing signals to the input/output module; and an analog to digital converter for outputting signals from the input/output module to the satellite communications module.

15. A pipeline monitoring system, comprising:

a plurality of monitoring stations positioned along a pipeline;

a central monitoring facility for generating command signals to operate each of the plurality of monitoring stations;

a satellite communications module at each of the plurality of monitoring stations for interfacing with the central monitoring facility;

a pipeline marker for housing the satellite communications module; and a pipeline damage detector for outputting a potential pipeline damage signal to the satellite communications module.

16. The pipeline monitoring system as defined in claim 15, wherein the central monitoring facility includes a control station to output command signals to the plurality of monitoring stations.

17. The pipeline monitoring system as defined in claim 15, further comprising:

an input/output module for outputting an activity signal to operate the monitoring station in response to the magnetic pig position detector.

18. The pipeline monitoring system as defined in claim 15, wherein the pipeline damage detector includes a pipeline vibration sensor.

19. The pipeline monitoring system as defined in claim 15, wherein the pipeline damage detector includes a geophone.

20. A method of monitoring a pipeline having a plurality of monitoring stations, comprising:

passing a magnetic pig through the pipeline;

detecting the passage of a magnetic pig at each of a plurality of monitoring stations;

providing a satellite communications module at each of the plurality of monitoring stations for communicating with a central monitoring facility;

outputting a signal from the satellite communications module to the central monitoring facility in response to the passage of the magnetic pig; and generating command signals at the central monitoring facility and forwarding the command signals to the satellite communications module to operate each of the plurality of monitoring stations;

detecting potential pipeline damage and outputting a pipeline damage signal to the satellite communications module in response thereto; and actuating a valve in response to the detection of the passage of the magnetic pig.

21. The method as defined in claim 20, further comprising:

each monitoring station transmitting data collected at the monitoring station to the central monitoring facility in response to a command signal.

22. The method as defined in claim 20, further comprising:

providing a station identification and event time to the central monitoring facility when the magnetic pig is detected;

determining the speed of the magnetic pig moving through the pipeline; and estimating the time of arrival of the magnetic pig at another monitoring station.

23. The method as defined in claim 20, further comprising:

detecting pipe/soil potentials and outputting a voltage signal to the satellite communications module in response thereto.

24. The method as defined in claim 20, further comprising:

providing an input/output module for outputting an activity signal to operate the monitoring station in response to the passage of the magnetic pig.

25. A pipeline monitoring system, comprising:

a plurality of monitoring stations positioned along a pipeline;

a central monitoring facility for generating command signals to operate each of the plurality of monitoring stations;

a satellite communications module at each of the plurality of monitoring stations for interfacing with the central monitoring facility; and upwardly extending generally tubular pipeline marker for housing the satellite communications module.

26. The pipeline monitoring system as defined in claim 25, wherein each of the plurality of monitoring stations includes a computer for outputting an activity signal to operate the monitoring station.

27. The pipeline monitoring system as defined in claim 25, wherein said satellite communications module outputs a time signal in response to a magnetic pig position detector.

28. The pipeline monitoring system as defined in claim 25, further comprising:
an input/output module for outputting an activity signal to operate the monitoring station in response to the magnetic pig position detector.

29. The pipeline monitoring system as defined in claim 25, further comprising:
a flow meter sensor for outputting a fluid flow rate signal to the satellite communications module indicative of fluid flow rate through the pipeline.

30. The pipeline monitoring system as defined in claim 25, further comprising:
a magnetic pig position detector at each of the plurality of monitoring stations for detecting the passage of a magnetic pig and outputting a pig position signal to the central monitoring facility.

31. The pipeline monitoring system as defined in claim 25, further comprising:
a valve position sensor for outputting a valve position signal to the satellite communications module.

32. The pipeline monitoring system as defined in claim 25, wherein the pipeline marker also houses one or more battery packs.

* * * * *